United States Patent [19]

Underwood

[11] Patent Number: 5,042,636
[45] Date of Patent: Aug. 27, 1991

[54] APPARATUS AND METHOD FOR DISPLACING CONVEYED ARTICLES

[76] Inventor: Robert Underwood, 343 Park Ave., Unit 7 E, Highland Park, Ill. 60035

[21] Appl. No.: 499,113

[22] Filed: Mar. 26, 1990

[51] Int. Cl.⁵ .............................................. B65G 37/00
[52] U.S. Cl. .................................. 198/372; 198/440; 198/732
[58] Field of Search ............... 198/732, 440, 437, 367, 198/372; 209/651, 654

[56] References Cited

U.S. PATENT DOCUMENTS

| | | | |
|---|---|---|---|
| 2,769,528 | 11/1956 | Goodrich et al. | 198/732 X |
| 3,165,193 | 1/1965 | Stevenson, Jr. | 198/440 X |
| 3,166,181 | 1/1965 | Rutkus et al. | 198/732 X |
| 3,170,572 | 2/1965 | Harrison | 209/651 X |
| 3,554,132 | 1/1971 | Hanna et al. | 198/732 X |
| 3,690,439 | 9/1972 | Kuehl et al. | 198/732 X |
| 4,101,020 | 7/1978 | Langen | 198/732 X |

FOREIGN PATENT DOCUMENTS

| | | | |
|---|---|---|---|
| 255425 | 1/1913 | Fed. Rep. of Germany | 198/440 |
| 0005150 | 1/1977 | Japan | 198/440 |
| 0617150 | 5/1980 | Switzerland | 198/440 |

*Primary Examiner*—Robert P. Olszewski
*Assistant Examiner*—Cheryl L. Gastineau
*Attorney, Agent, or Firm*—Joseph C. Mason; Ronald E. Smith

[57] ABSTRACT

Items carried by a conveyor belt are deflected from their original path of travel by deflector members that travel at the same speed as the belt, in some embodiments, or by deflector members that travel in a wave-like motion with the items in other embodiments. In all embodiments, the profile and preselected characteristics of each item are sensed and a computer determines which deflectors to deploy into path-diverting relation to the items. Thus, any pattern of deflectors can be deployed. The deflectors may be deployed gradually as they travel past a trigger member moving a slightly different speed or they may be deployed abruptly when traveling past a fixed position trigger member.

5 Claims, 16 Drawing Sheets

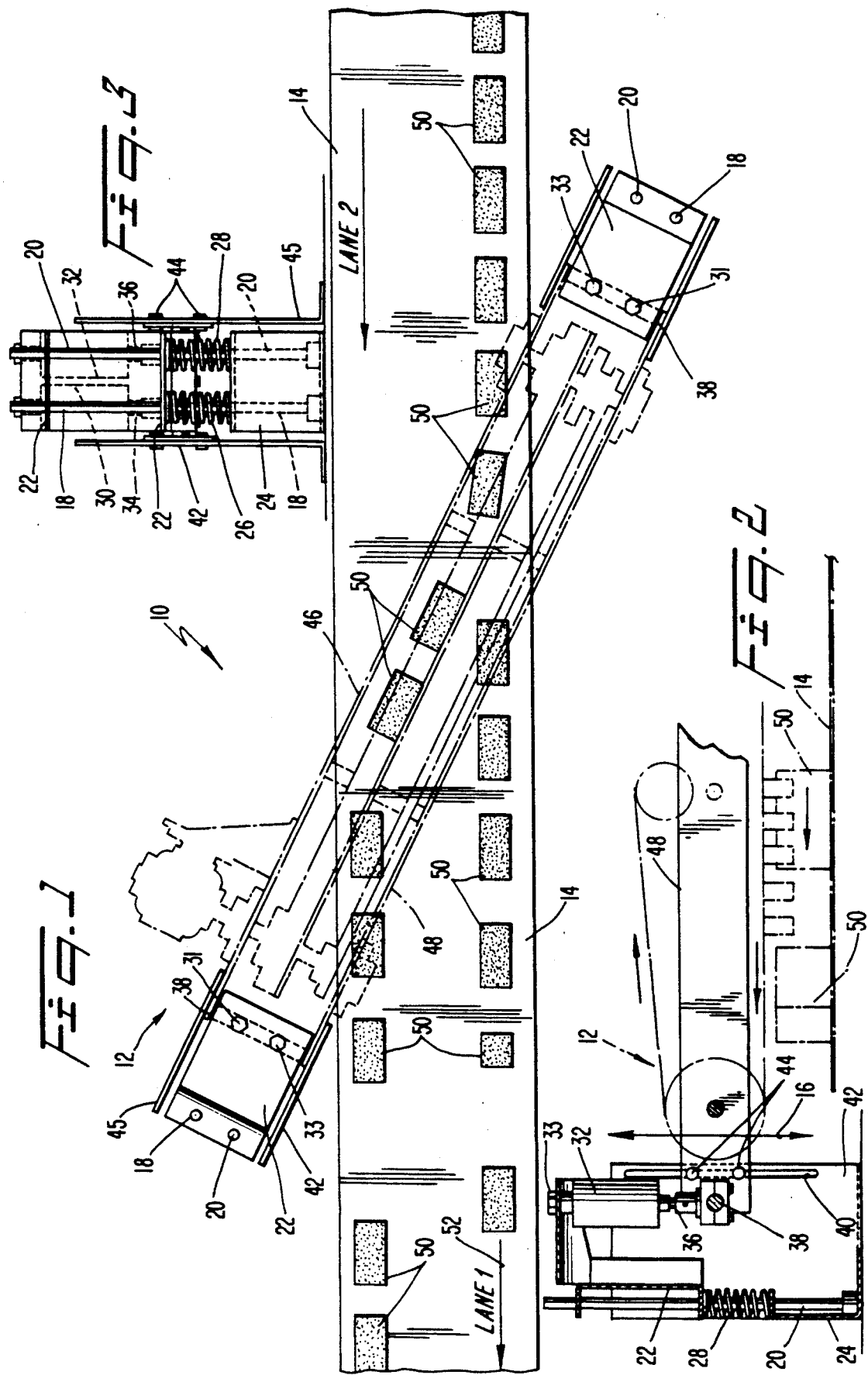

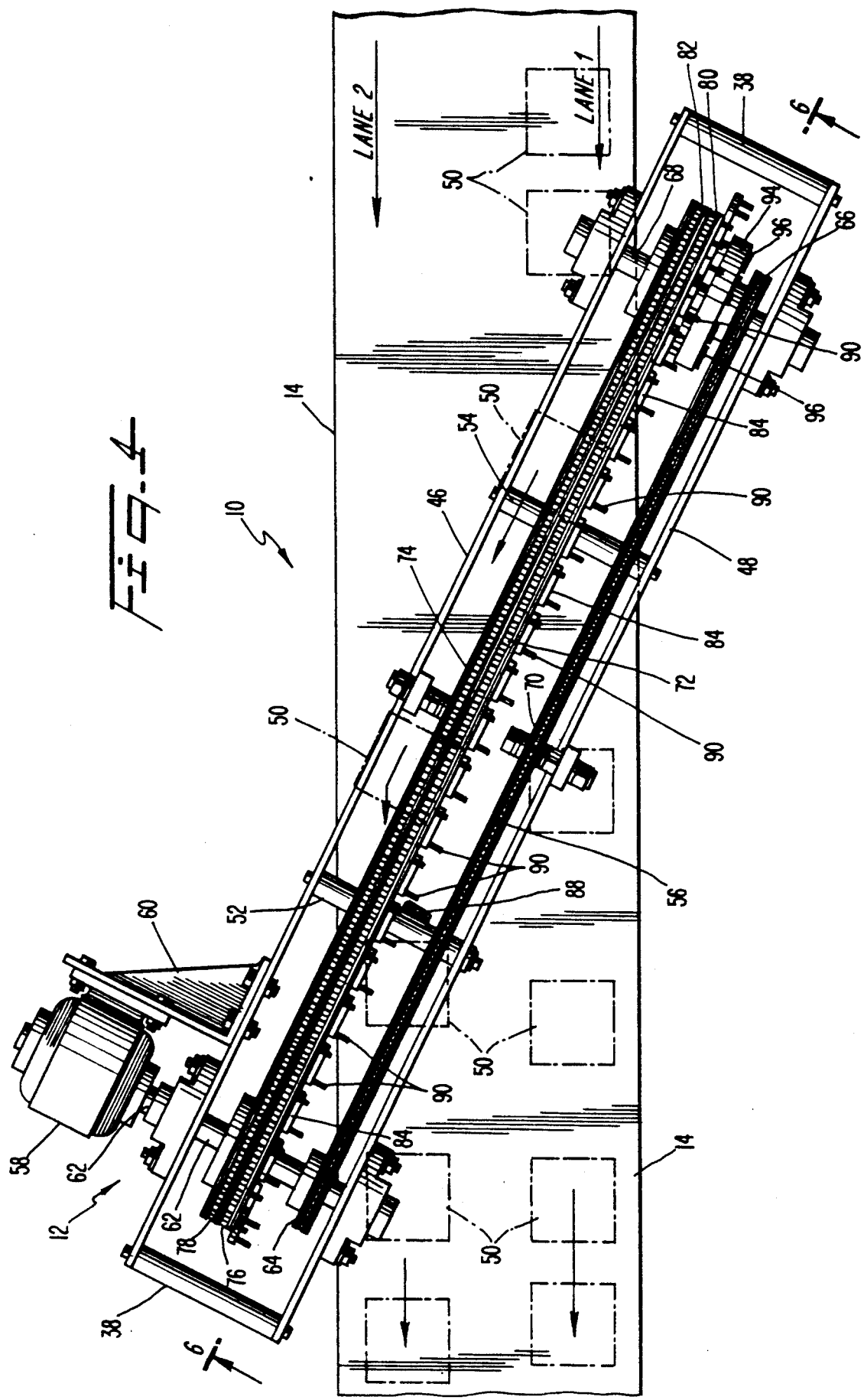

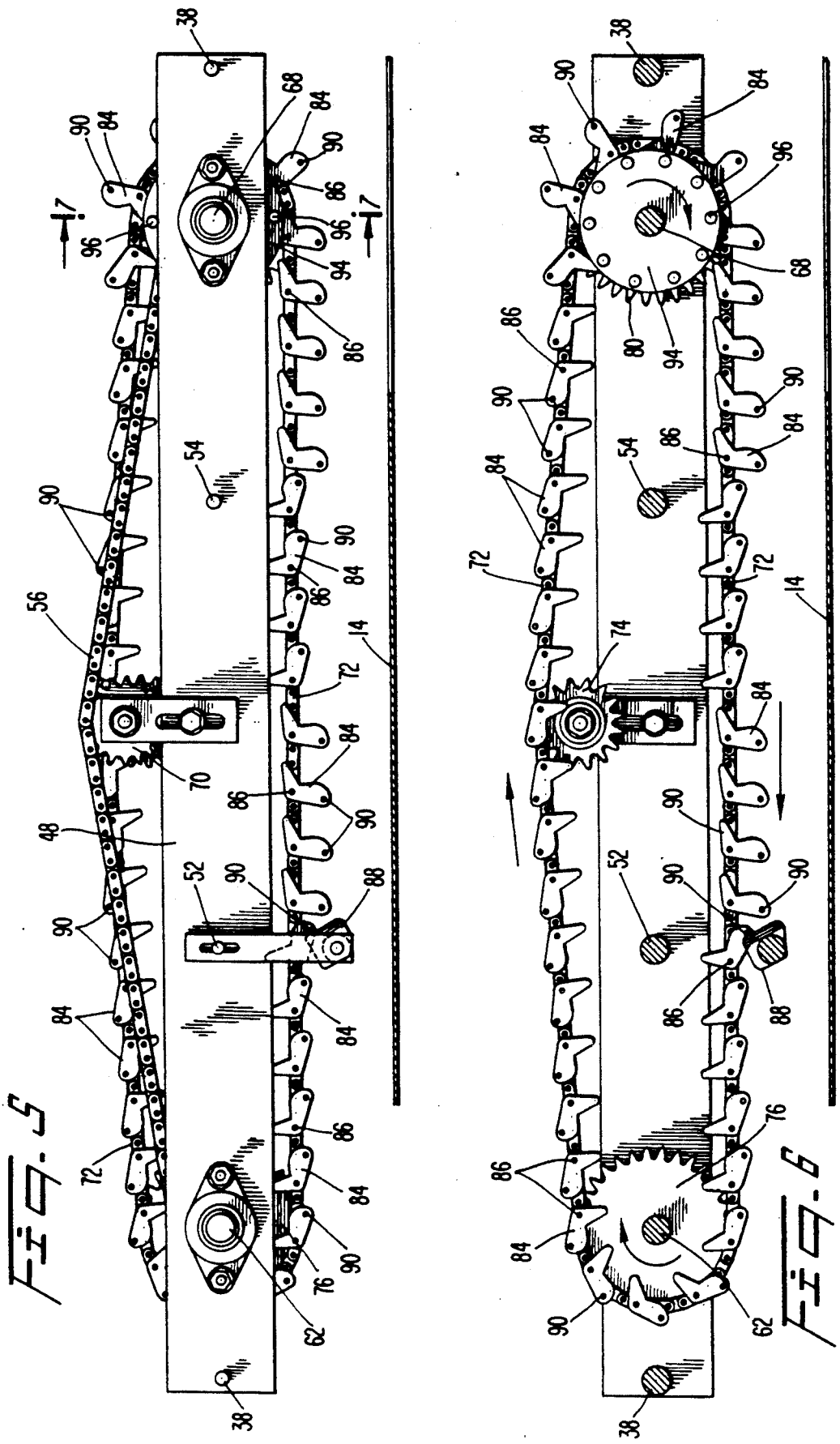

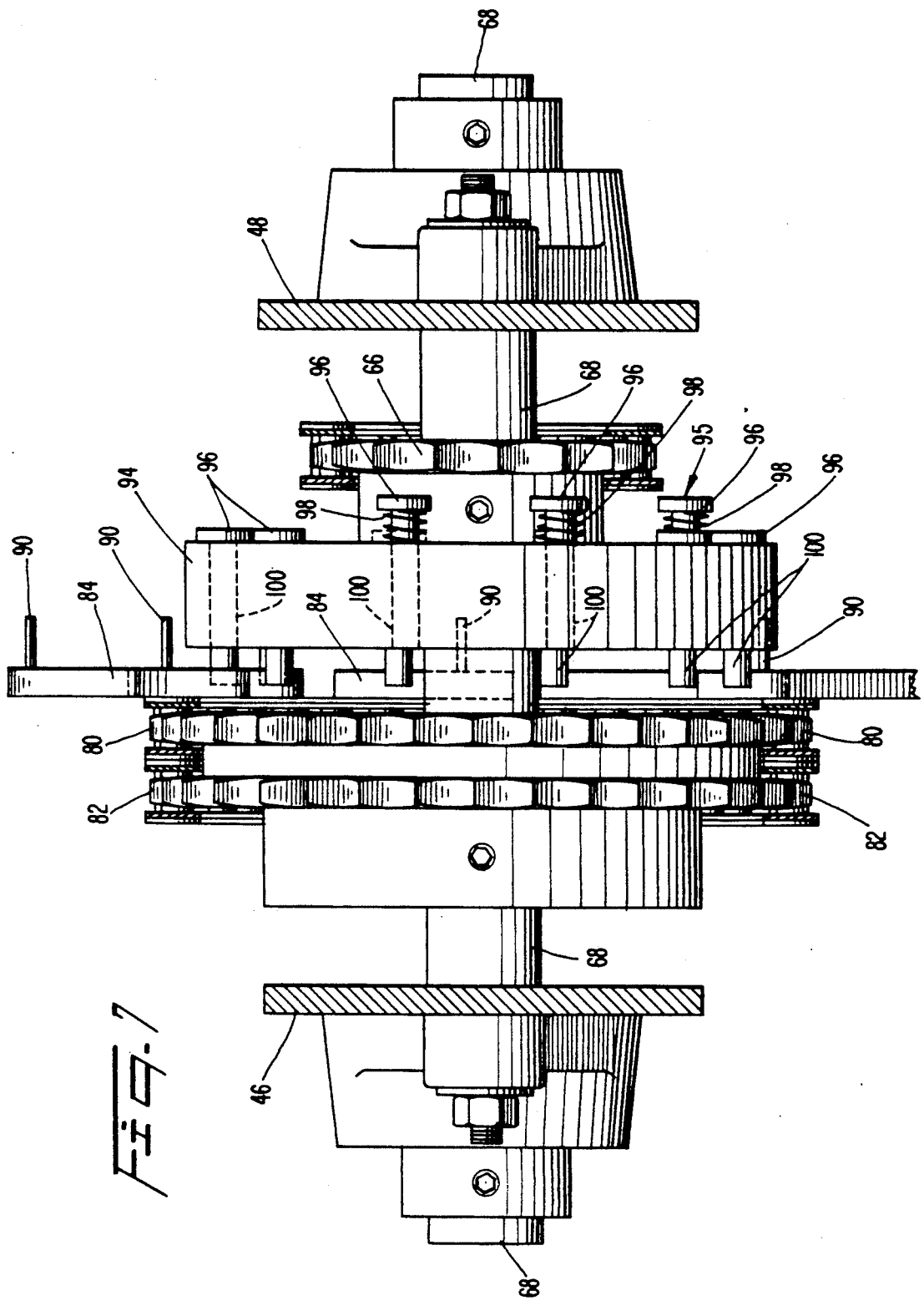

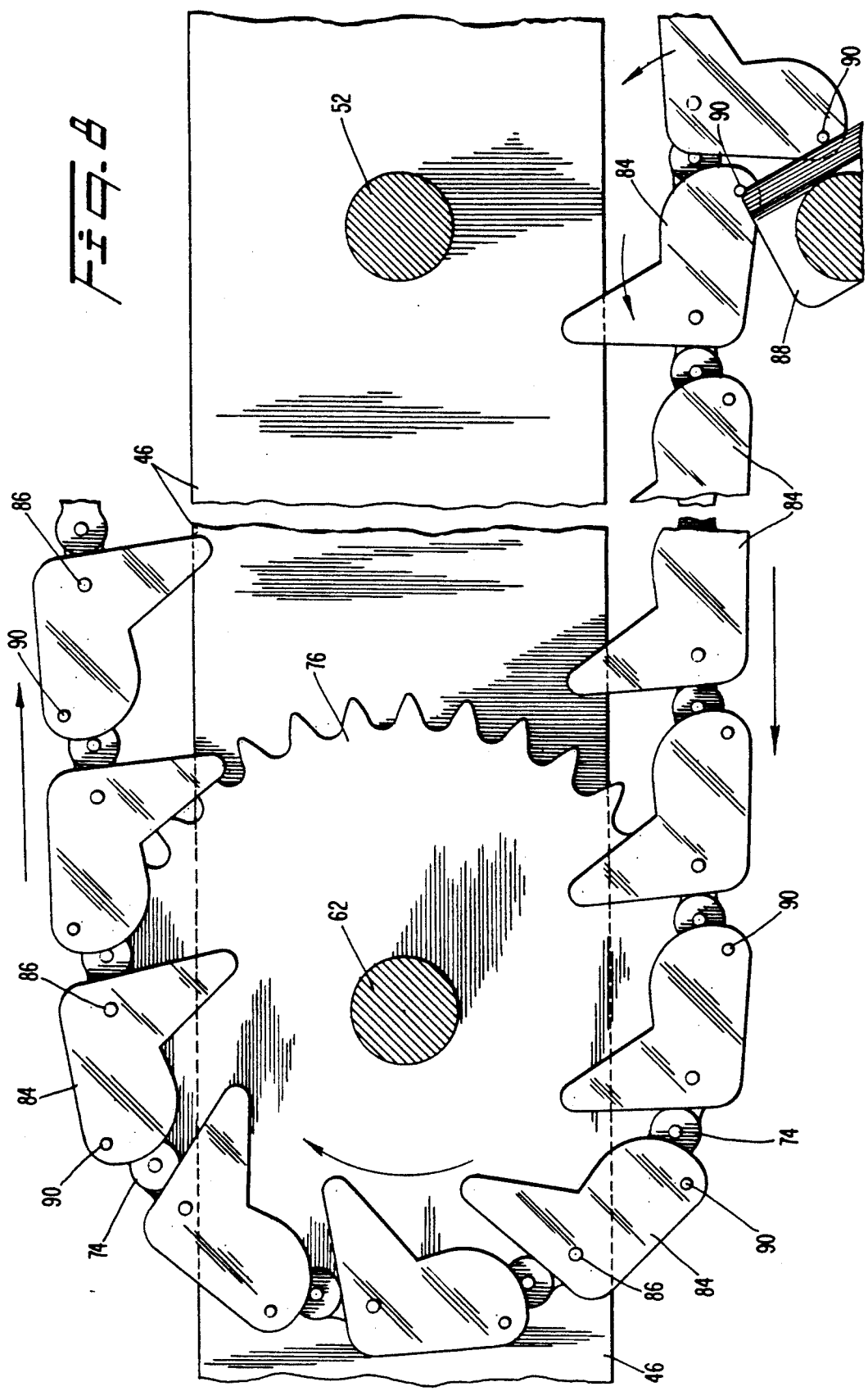

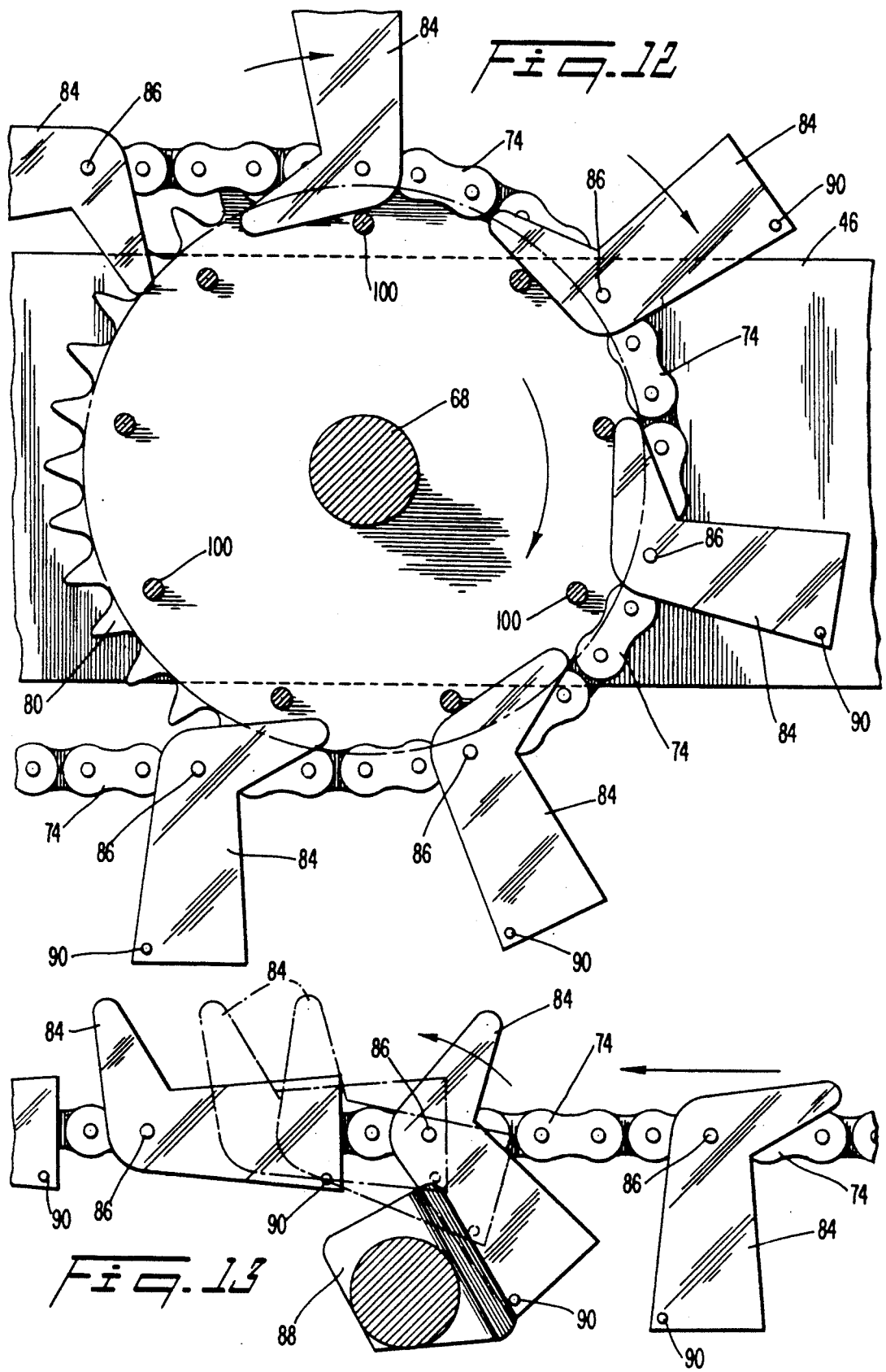

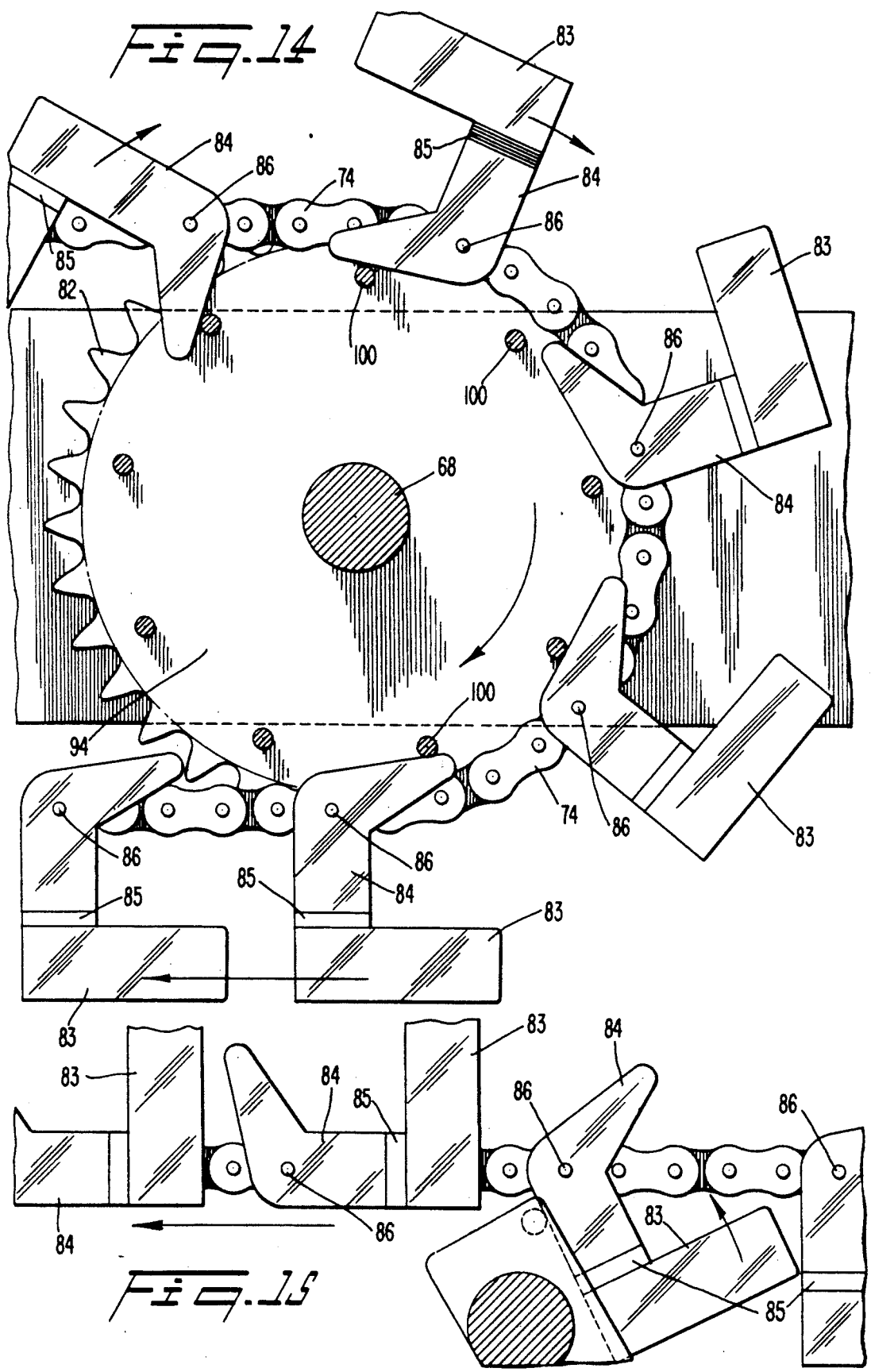

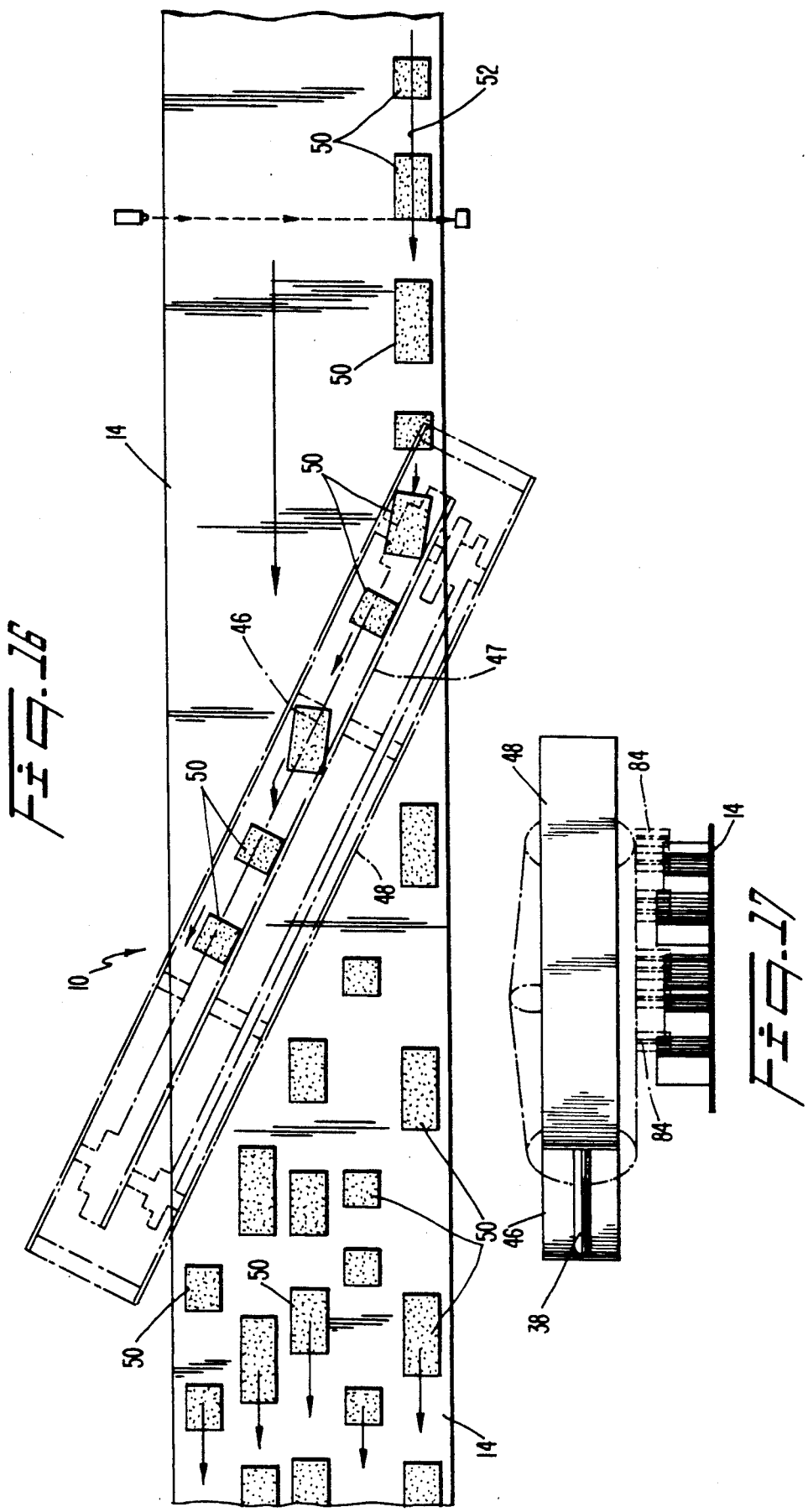

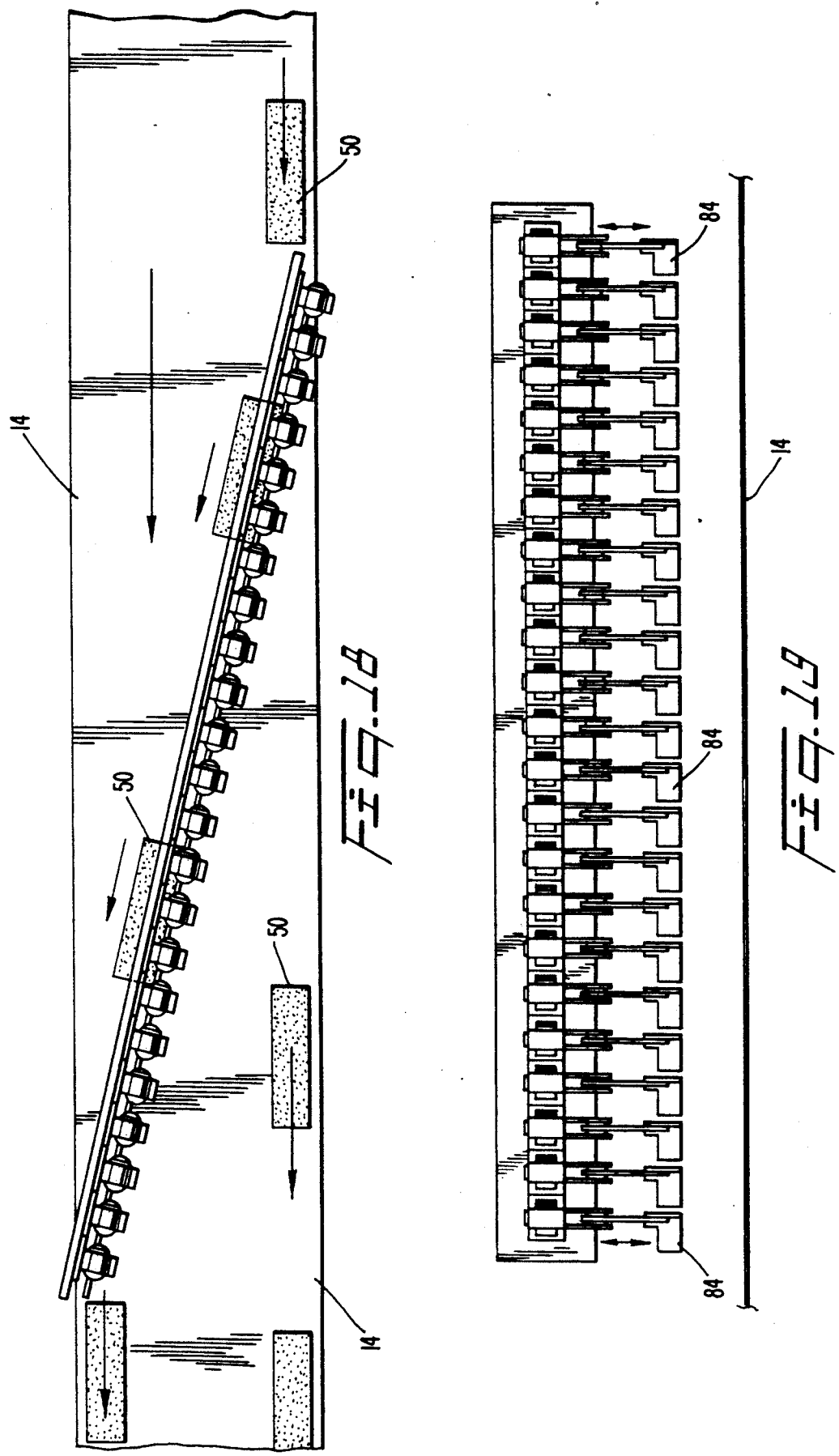

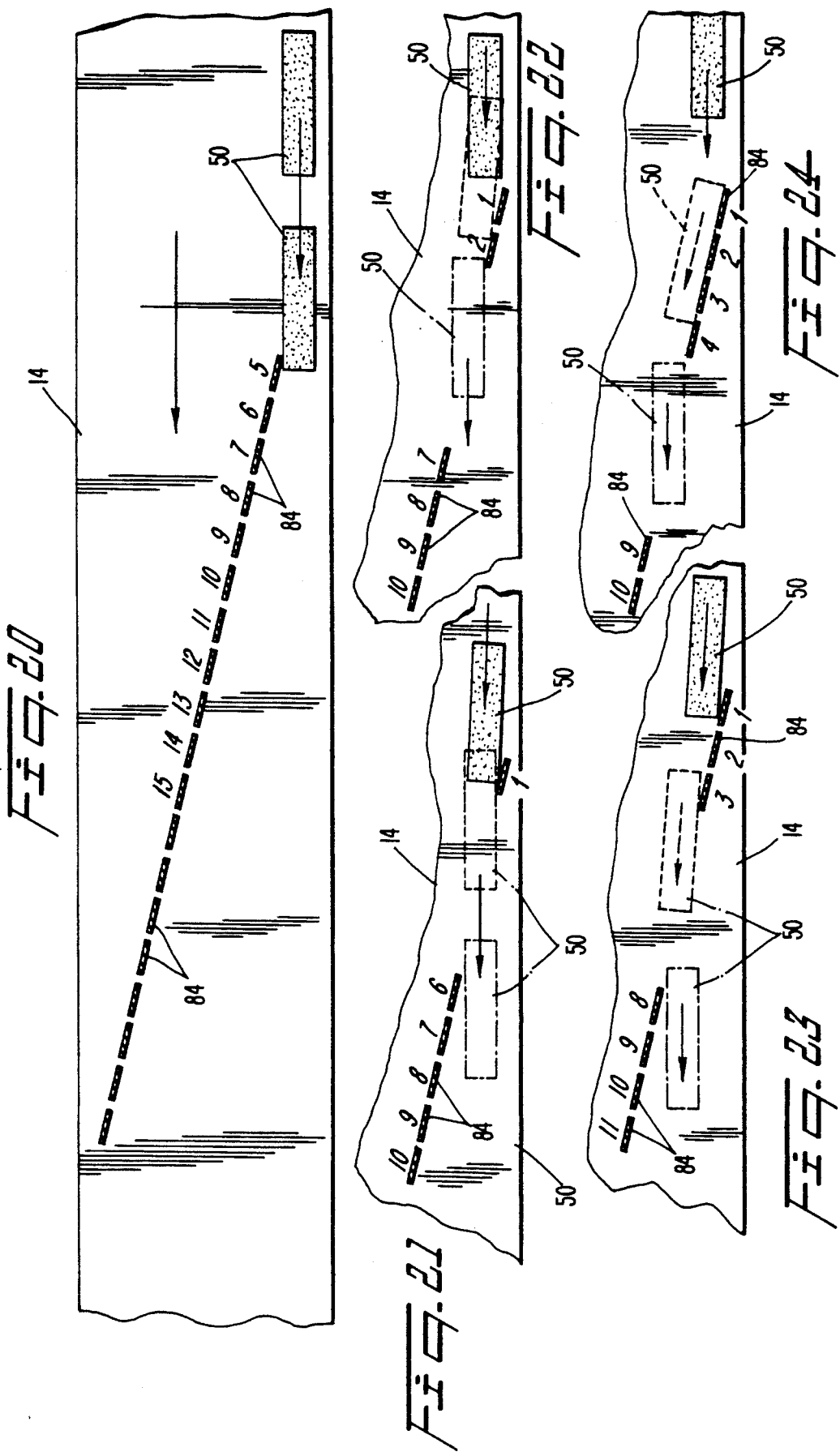

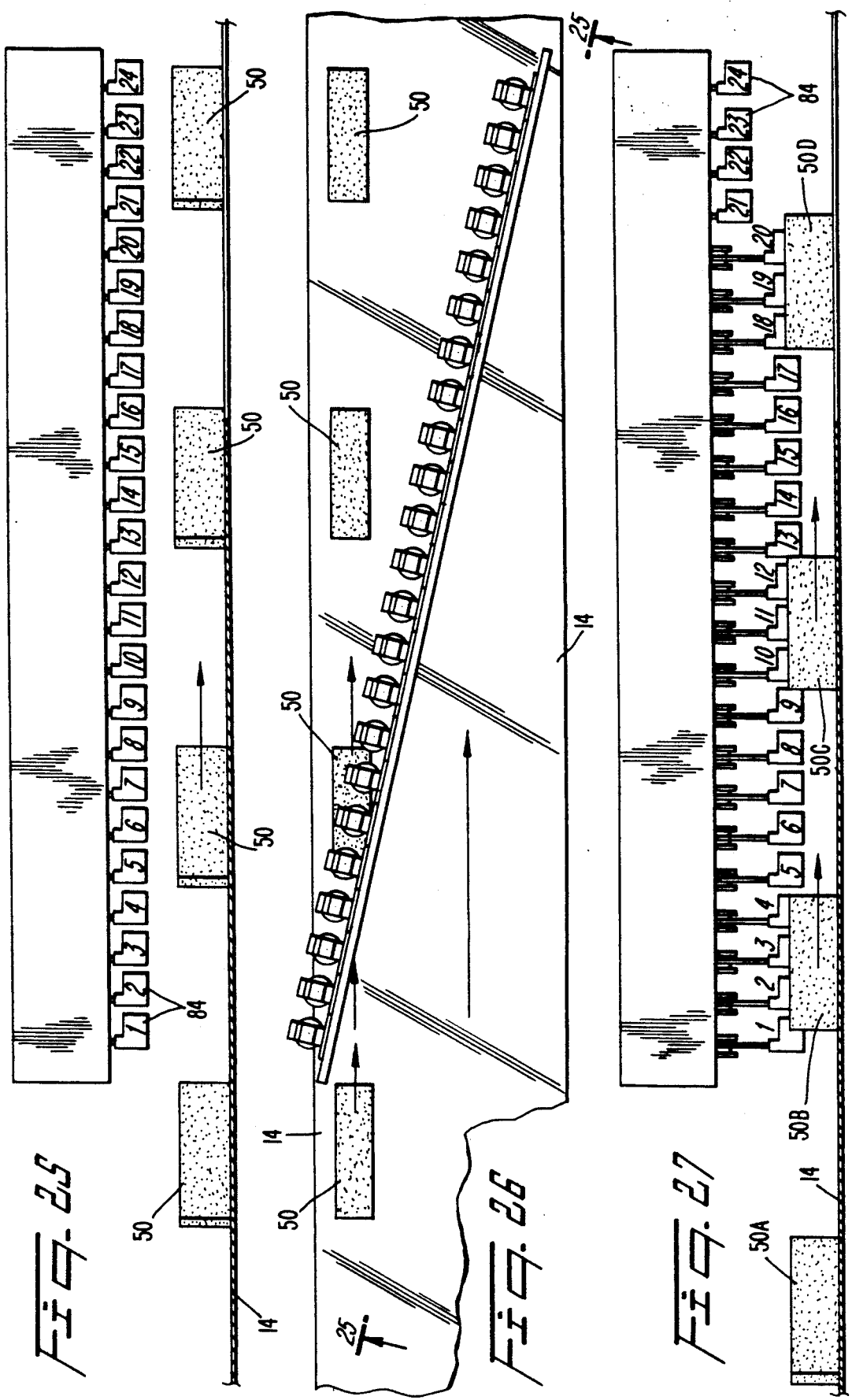

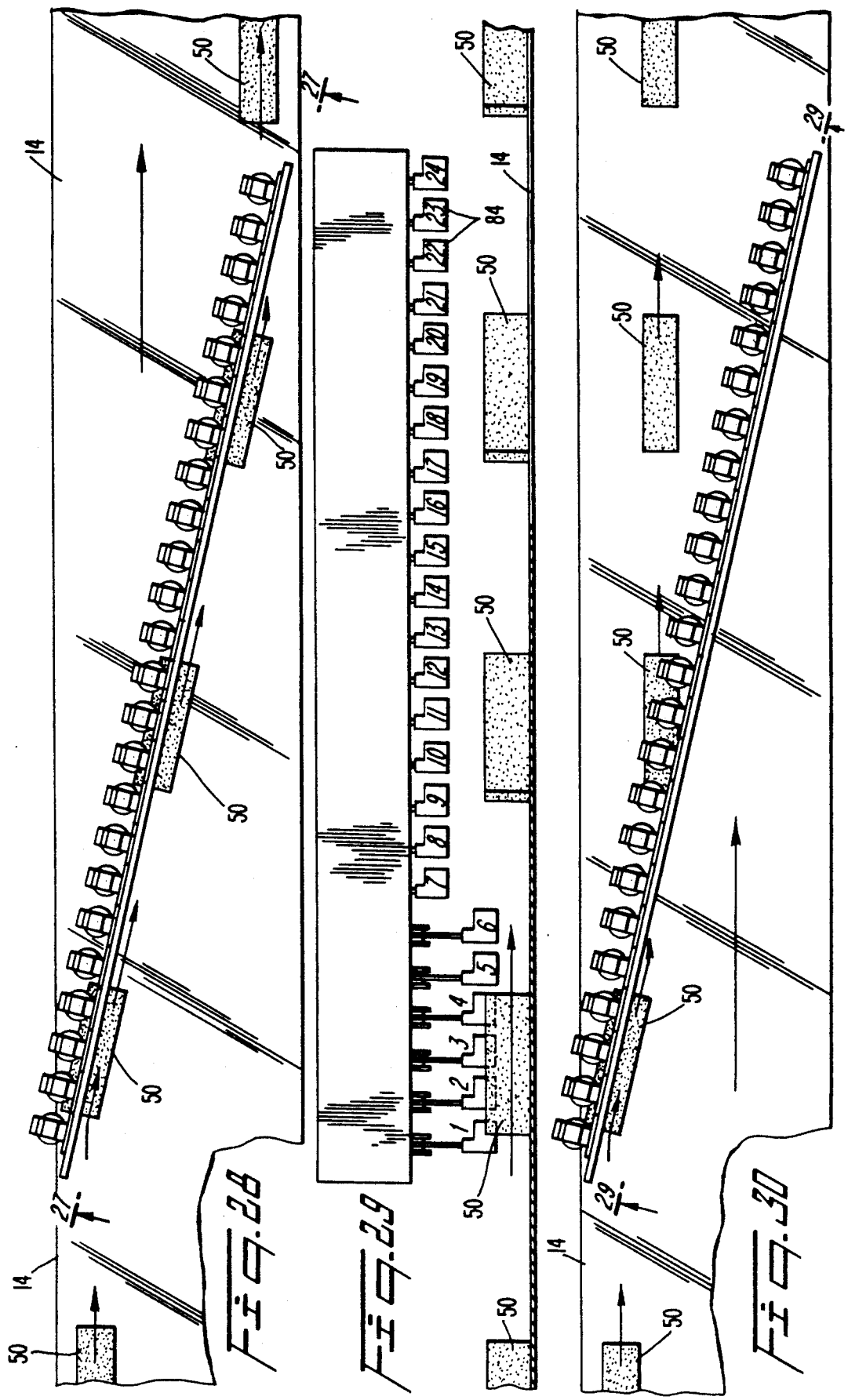

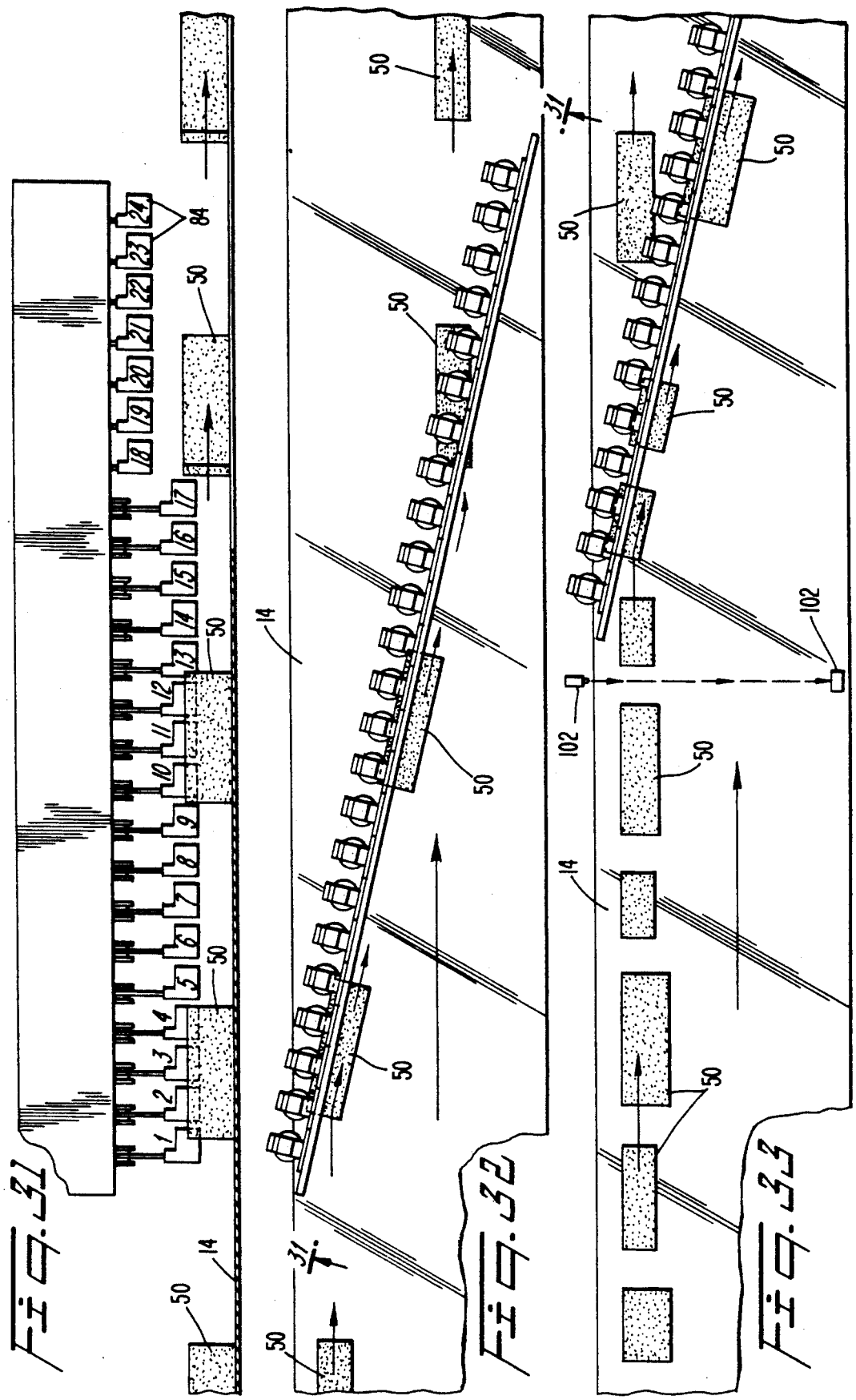

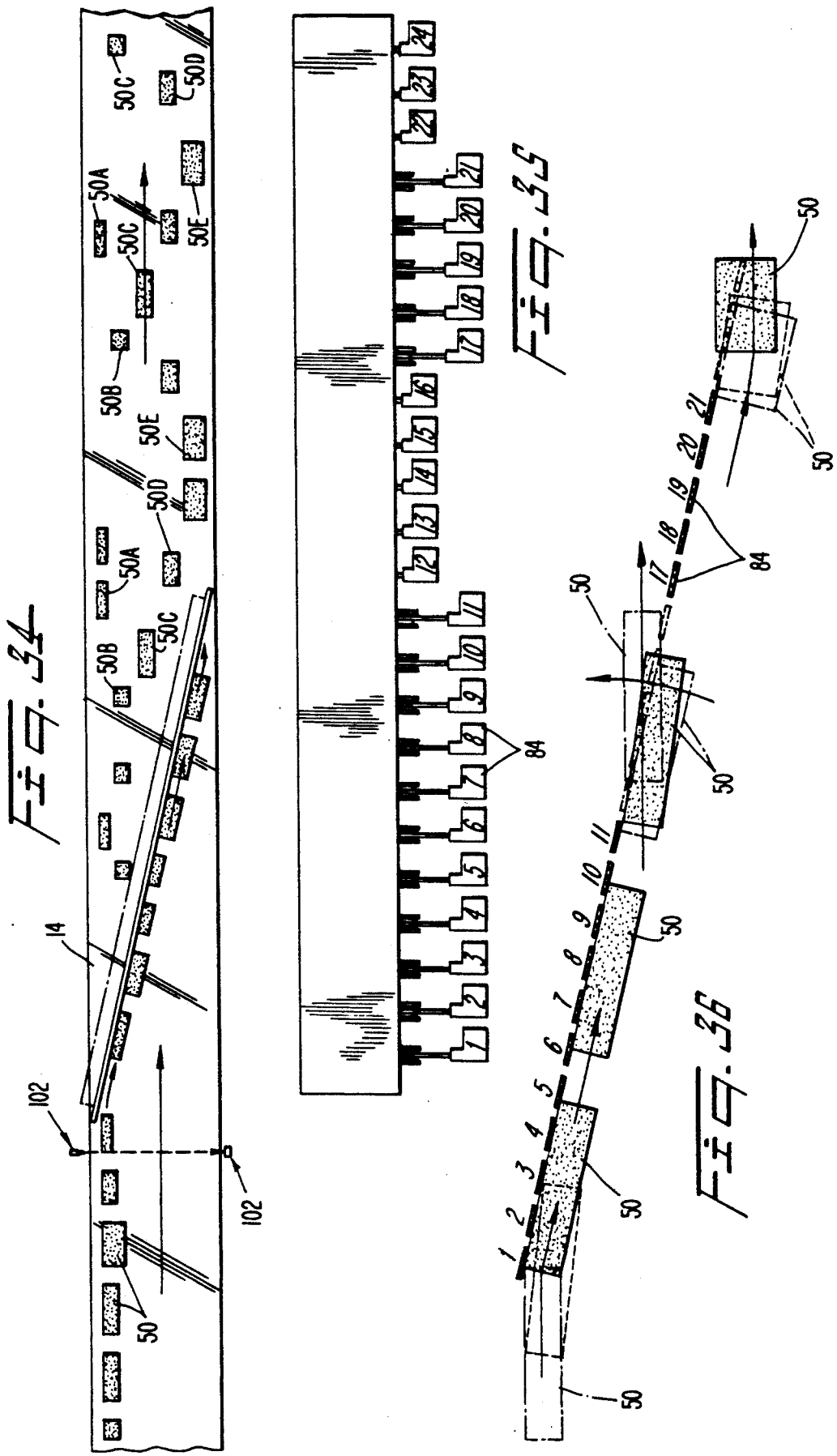

APPARATUS AND METHOD FOR DISPLACING CONVEYED ARTICLES

TECHNICAL FIELD

This invention relates, generally, to improvements in conveyor belts. More particularly, it relates to means for diverting preselected articles from a predetermined path of travel.

BACKGROUND ART

Numerous systems exist for displacing articles being transported by a conveyor belt. Perhaps the simplest systems are those that remove defective items from a belt. For example, where a product is sold by weight, each container is carried over a weighing station where its weight is determined. If a container is too light, e.g., that particular container is deflected off the belt. A simple system thus includes a deflecting gate that is activated by a signal from the weighing station. The gate, when activated, swings out into the path of travel of the unacceptable package and constrains it to follow a path of travel that carries it off the belt to a reject station. It is important to note that in a simple system of this type, there is relative motion between the container and the gate because the gate is stationary.

Similar gates, in more complex systems, are used to redirect containers on a belt to different lanes. For example, recycled soft drink bottles from different companies are commonly sorted at a facility equipped with means for detecting the difference between the bottles of differing soft drink companies. If the facility handles bottles from six different companies, e.g., gating means are provided to direct incoming bottles, which are randomly placed on the conveyor, into six different lanes. Thus, articles are not deflected off the belt in systems of this type, although a multiple-lane forming system can be used in conjunction with a rejection-type system.

Thus, in the lane forming systems, as in the rejecting systems, there is relative motion between the moving product and the stationary gate.

The art of conveyor systems in general is well developed, but the art has not produced diverting means that travel at the same speed as the conveyed article to substantially eliminate relative motion therebetween. Such an improved system would be desirable because the friction generated by the relative motion often causes jams and the loss of product that usually results from jams. The prior art, taken as a whole, neither teaches nor suggests how the relative motion between product and deflecting gate could be eliminated.

DISCLOSURE OF INVENTION

The present invention includes four separate illustrative embodiments, two of which do not eliminate relative motion between a deflecting gate and a conveyed article and two of which that do.

In all embodiments, the novel apparatus is placed in bridging or cantilever relation to a conveyor belt, at a preselected height thereabove and at a predetermined angle relative thereto.

In the first and second embodiments, deployed or extended deflector members move at the same rate of speed as the moving conveyor belt and, accordingly, there is no relative motion between the conveyed article and the moving deflectors. More particularly, the deflectors are pivotally mounted to lug members that extend transversely from a chain or other lug member transport element that travels at the same rate of speed as the conveyor belt. Thus, the deflectors travel at substantially the same speed as the belt.

In the first embodiment, the deflectors are deployed into their article-diverting disposition by a fixed position trigger member. Each deflector is a flat bell crank-like member, oriented in a vertical plane, that has a pair of arms and a pivot point therebetween. The pivot point is defined by the lug that extends transversely from the chain. Thus, a trigger member in the form of a fixed position obstacle disposed in the path of travel of the deflector will cause said deflector to rotate about its pivot point, thereby deploying it.

Sensor means are provided to pull the trigger out of the path of a deflector so that it is not deployed when said sensor means detects a container not requiring diversion. Thus, any pattern of deployed deflectors is achieved by selective triggering of the stationary trigger member.

Those skilled in the mechanical arts will observe that a fast moving deflector will be abruptly deployed when the stationary trigger member is encountered, i.e., the deflector will undergo a transition from fully retracted to fully deployed as it passes the position of the extended trigger member. Such rapid deployment subjects the deflector to considerable mechanical stress. Moreover, the stationary trigger member is subjected itself to very high speed extensions and retractions which are also mechanically stressful.

The second embodiment overcomes these limitations of the first embodiment. The trigger mechanism moves in the same direction as the traveling deflectors, at a slightly different rate of speed. In this manner, the trigger member, when extended, deploys the deflector gradually, thereby eliminating the high impact deployment of the first embodiment. If an extended trigger member is traveling slightly faster than the retracted deflector, the deflector will rotate into its deployed position in a first angular direction, and if an extended trigger member is traveling slightly slower than the retracted deflector, the deflector will rotate in a second, opposite angular direction into its deployed configuration. Either way, the deployment is gradual and thus is not mechanically stressful.

The means for obtaining the gradual deployment of the deflector is also highly novel.

A plurality of transversely extending, reciprocally mounted trigger members or pins are carried by and are circumferentially spaced about a trigger wheel that is transversely spaced apart from the sprocket wheel that drives the chain that carries the deflectors. The trigger wheel rotates at a slightly different angular velocity than the chain-driving sprocket wheel so that when a trigger member carried thereby is extended, it gradually pivots an associated deflector into its deployed configuration. The trigger members are extended into deflector deploying relation or retracted into non-contacting relation to the deflectors by signals from a sensor means that senses preselected parameters of the articles on the conveyor belt.

In a third embodiment, a plurality of deflectors having an extended position where they deflect transported articles and a retracted position where the articles pass by unaffected are positioned in laterally aligned relation to one another in bridging relation to the conveyor belt (or suitable substitute), at a predetermined angle thereto. The deflectors are normally deployed, and are selectively retractable in a sequence under the control of a sensor. Thus, if a small diversion is desired, a first deflector might remain deployed and a certain number of deflectors immediately contiguous thereto would retract to allow the transported article to assume its original direction of travel after the small deflection. As greater amounts of deflection are desired, more deflectors remain deployed. The number of contiguous deflectors that retract to allow the deflected article to continue on its original direction of travel is determined by the sensor, i.e., the sensor determines the size of each transported article and controls the retraction of deflectors accordingly.

In a final embodiment, a plurality of deflectors having a retracted position where they do not interact with product moving on a belt and an extended position where they do are positioned in laterally aligned relation with one another and in bridging relation to a conveyor belt, at a predetermined angle thereto, as in the third embodiment. Also as in the third embodiment, deflectors are extended or deployed in diverting relation to the product in a unique programmed sequence under the control of a sensor. Specifically, and in contrast to the sequence of the third embodiment, one or more contiguous deflectors are momentarily deployed into the path of an article to be diverted; when the article is thereby diverted, the deflectors return to their retracted position so as not to interfere with following products. If only a small diversion is necessary, no further deployments are required. However, where further diversion is necessary, a second or second group of deflectors, contiguous to the first, are momentarily deployed, and so on until the article has been shunted from its original path of travel to the extent desired. The sequence of deployment and retraction creates a wave-like effect along the extent of the novel unit, i.e., from the point of view of the article on the belt, all of the deflectors are deployed but to a stationary observer, only those deflectors in contact with the moving article are deployed. Thus, it should be understood that the deployed deflectors appear to move in a wave-like motion to a stationary observer, but there is relative motion between the conveyed article and the individual deployed deflectors because each deflector has a fixed position relative to the moving belt. This embodiment, then, may be understood as being similar to the third embodiment, but operating in an opposite manner.

It should therefore by understood that a general object of this invention is to advance the art of conveyor systems.

A more particular object is to provide means for diverting articles from conveyor belts that are substantially friction free.

These and other objects and advantages of the invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is a top plan view of an illustrative embodiment of the invention, in simplified form;

FIG. 2 is a side elevational view of the height adjustment means for raising and lowering the novel apparatus with respect to a conveyor belt;

FIG. 3 is an end elevational view of the height adjustment means of FIG. 2;

FIG. 4 is a top plan view similar to FIG. 1, but showing increased structural detail;

FIG. 5 is a side elevational view of the apparatus shown in FIG. 4;

FIG. 6 is a sectional view taken along line 6—6 in FIG. 4;

FIG. 7 is sectional view taken along line 7—7 in FIG. 5;

FIG. 8 is a detailed view of parts shown at the left side of FIG. 6;

FIG. 12 is a view similar to FIG. 9, but showing alternate forms of the deflector members of this invention;

FIG. 13 is a side elevational, animated diagram showing how the deflectors of FIG. 12 are retracted:

FIG. 14 is a view similar to FIGS. 9 and 12, but showing another alternative form of the deflector members of this invention;

FIG. 15 is a side elevational view showing how the deflectors of FIG. 14 are retracted;

FIG. 16 is a top plan view of a third embodiment of this invention, in simplified form;

FIG. 17 is a side elevational view of the embodiment of FIG. 16;

FIG. 18 is a top plan view similar to FIG. 16, but showing increased structural detail relating to the deflectors, and omitting other structural detail to simplify the drawings;

FIG. 19 is a side elevational view of the apparatus depicted in FIG. 18;

FIG. 20 is a top plan, simplified view of a first configuration of the deflectors shown in FIGS. 18 and 19;

FIG. 21 shows a second configuration thereof;

FIG. 22 shows a third configuration thereof;

FIG. 23 shows a fourth configuration thereof;

FIG. 24 shows a fifth configuration thereof;

FIG. 25 is a side elevational view of a first configuration of a fourth embodiment of the invention, taken along line 25—25 in FIG. 26;

FIG. 26 is a top plan view of the fourth embodiment;

FIG. 27 shows a second exemplary configuration thereof, taken along line 27—27 in FIG. 28;

FIG. 28 is a top plan view of the configuration shown in FIG. 27;

FIG. 29 is a side elevational view of a third exemplary configuration of the fourth embodiment, taken along line 29—29 in FIG. 30;

FIG. 30 is a top plan view of the configuration shown in FIG. 29;

FIG. 31 is a side elevational view of a fourth exemplary configuration, taken along lines 31—31 in FIG. 32;

FIG. 32 is a top plan view of said fourth configuration;

FIG. 33 is a top plan view, showing the use of an electric eye;

FIG. 34 is a top plan view, showing the sorting capabilities of the novel system;

FIG. 35 is a side elevational view showing still another possible configuration;

FIG. 36 is a top plan diagramatic view of the configuration shown in FIG. 35;

Similar reference numerals refer to similar parts throughout the several views of the drawings.

BEST MODES FOR CARRYING OUT THE INVENTION

Figure 9:
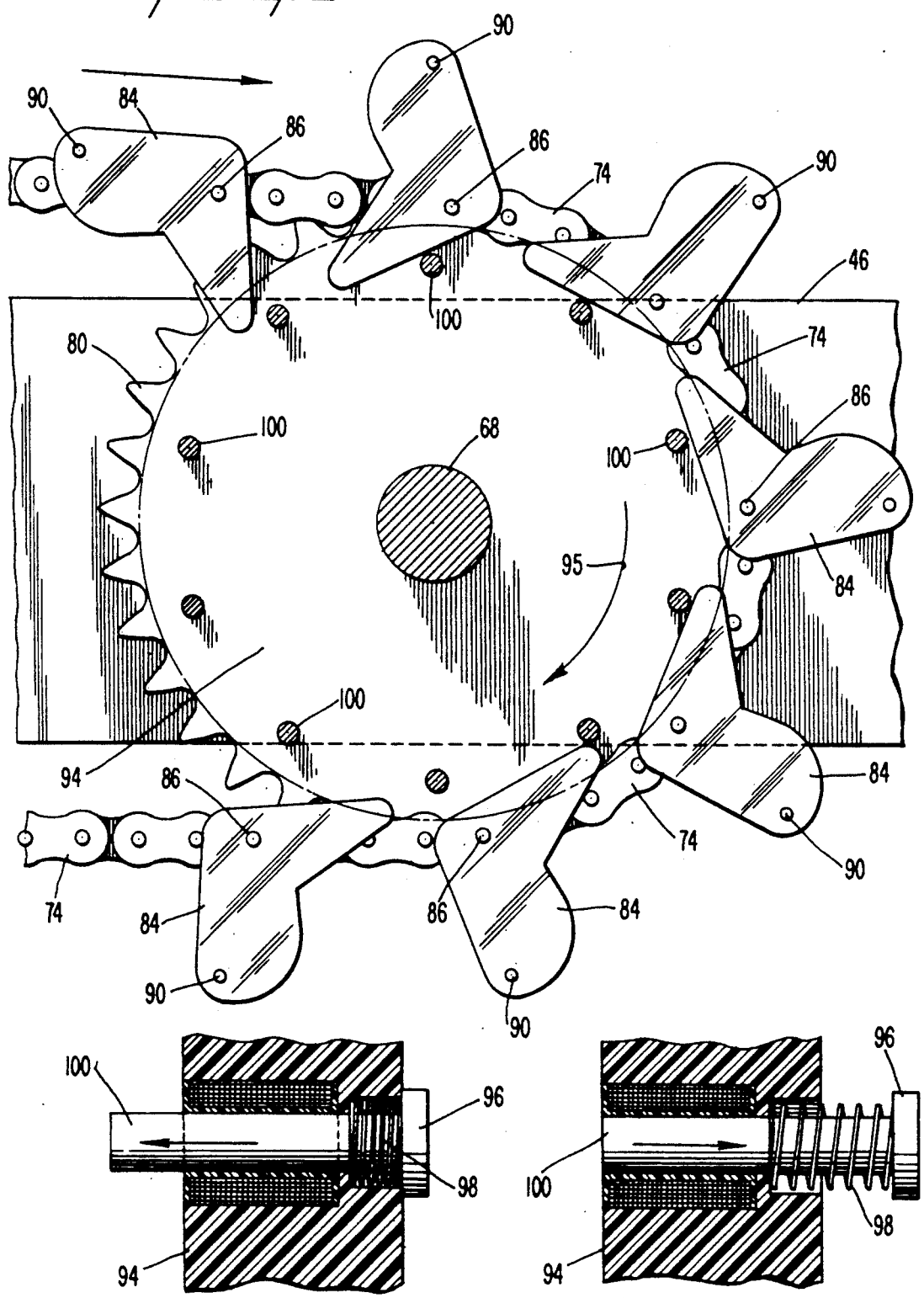
FIG. 9 is a detailed view of parts shown at the right side of FIG. 6.

A typical arrangement of the novel apparatus in relation to a conveyor belt is shown in FIG. 1 and is denoted as a whole by the reference numeral 10. It should be understood from the outset that the angular orientation between the novel apparatus, referred to generally as 12, and belt 14 may vary widely.

As shown in FIG. 2, apparatus 12 is disposed in bridging relation to belt 14; importantly, as indicated by the doubleheaded reference arrow 16, apparatus 12 has a plurality of functional positions of vertical adjustment. Although those skilled in the art of machine design will be cognizant of numerous suitable structures for accomplishing the height adjustment, the depicted height adjustment means includes a pair of upstanding, transversely spaced post members 18, 20 (FIG. 3), each of which axially receives a suitably apertured upper bracket 22 and lower bracket 24. Shock absorbing members 26, 28 are sandwiched therebetween. Solenoids 30, 32 having plungers 34, 36, respectively, are secured to nuts 31, 33 to an integral part of upper bracket 22 as shown in FIGS. 1 and 2. Transversely extending rod 38, best shown in FIG. 2, is suitably held between confronting retainer members as depicted, said retainer members being secured by suitable means to the free ends of plungers 34, 36. Accordingly, rod 38 is moveable as indicated by arrow 16. A vertically extending slot 40 is formed in frame 42 and rollers 44 rollable therein guide the apparatus upwardly and downwardly with respect to conveyor 14 as the plungers are activated and deactivated. A similar slot is formed in frame 45 (FIG. 3) which is the counterpart to frame 42.

Rollers 44 are rotatably mounted to elongate, longitudinally extending flat frame members 46, 48 (FIG. 1) which provide the primary support means for apparatus 12. The vertical adjustment parts shown in connection with FIG. 2 are provided at each end of frames 46, 48, as shown in FIG. 1.

In FIG. 1, a plurality of containers, collectively denoted 50, are shown traveling single file in a lane denoted lane 1 in the direction indicated by arrow 52 at the left side of said FIG. Apparatus 12 is shown deflecting or diverting preselected containers 50 into a second, parallel lane denoted lane 2. Significantly, it should be observed that some containers are depicted downstream of apparatus 12 and are still in lane 1. Thus, it should be understood that apparatus 12 includes means for diverting individual preselected containers and for allowing preselected containers to continue traveling as carried by belt 14 in lane 1.

Apparatus 12 is shown in greater detail in FIG. 4. Transversely extending rods 38, 38 at opposite ends of apparatus 12, shown and described earlier in connection with the mechanism for adjusting the height of apparatus 12, are shown in full in FIG. 4 but the supporting structure therefor, shown in FIGS. 2 and 3, is deleted from FIG. 4 to simplify that drawing. Elongate frame members 46, 48 are further held in parallel relation to one another by transverse strengthening rods 52, 54.

In this first embodiment, three sprockets chains are employed. The first chain, denoted 56, is a drive chain. Motor 58, supported by bracket 60, has an output shaft 62 and drive chain 56 is meshingly engaged to sprocket wheel 64 that rotates conjointly with that output shaft as clearly shown on the left side of FIG. 4.

The opposite end of drive chain 56 is meshingly engaged with sprocket wheel 66 which wheel is carried by transverse rod 68 as shown at the right side of FIG. 4. A vertically adjustable tensioning sprocket wheel 70, best shown in FIG. 5, is positioned equidistantly from sprocket wheels 64, 66. In this manner, motor 58 effects rotation of shaft 68. Apparatus 12 further includes sprocket chains 72 and 74 which are disposed in closely spaced, parallel relation to one another; their respective opposite ends are meshingly engaged by sprocket wheels 76, 78 and 80, 82 respectively, as noted in FIG. 4.

Chain 72 and its sprocket wheels 76, 80 are better shown in FIG. 6. The pivotally mounted deflectors are collectively denoted 84 in FIGS. 4–6, but their bell crank-like construction is best shown in FIGS. 5 and 6. Importantly, each deflector 84 is pivotally mounted by means of a pivot shaft 86 carried by chain 72 at equidistantly spaced intervals along the extent thereof. Thus, each deflector 84 is free to pivot in a vertical plane about its associated pivot shaft 86. As perhaps best understood in connection with FIGS. 5 and 6, items carried on belt 14 can pass under unpivoted deflectors 84 without interruption, i.e., without affecting their original path of travel, whereas the path of travel of items that encounter a pivoted or deployed deflector will be changed, depending upon the amount of time said deflectors are deployed when in deflecting relation to that particular item.

Significantly, any preselected deflector 84 can be deployed, i.e., any pattern of deployed and undeployed deflectors is possible. Accordingly, items carried by belt 14 can be forced to simply change their path of travel a little or by a more substantial amount.

Since the deflections may take place at complete random, means are provided to insure that all deflectors are retracted after they have completed a pass over belt 14. The retraction or resetting is accomplished by fixed position reset plate 88, shown in FIGS. 4–6. Each deflector 84 includes a transversely extending lug 90 that slideably engages reset plate 88 as deflectors 84 travel therepast, which engagement effects pivoting of each deployed deflector 84 into its retracted position. FIGS. 5 and 6 depict a deflector 84 undergoing retraction, but the lugs 90 that slideably engage stationary reset plate 88 are best shown in FIG. 4.

It should be observed in FIGS. 5 and 6 that all deflectors 84 that have traveled past reset plate 88 are in their retracted mode. It should also be observed in those FIGS. that selective deployment of the deflectors occurs at the right side of those FIGS., i.e., some deflectors 84 may be deployed and some may remain retracted as shown by the four retracted deflectors 84 appearing just to the right of the middle of those FIGS. An improved means for accomplishing said selective deployment will be shown hereinafter, but a first embodiment of this invention contemplates a fixed position trigger member, denoted 92 and shown in phantom lines in FIG. 6, that would simply be placed in interrupting relation to the path of travel of each deflector 84, forcing each deflector to rotate about its pivot shaft 86 abruptly as it passes trigger 92. Suitable means would be provided to withdraw trigger 92 out of the path of travel of those deflectors 84 that were to remain in their retracted configuration, i.e., if trigger 92 were provided in the form of a rod as suggested in FIG. 6, suitable means would be provided to effect rapid axial displacement of said rod into and out of obstructing relation to the deflectors 84, thereby achieving the desired selective deployment of the deflectors.

The preferred means for attaining the selective deployment of the deflectors is shown in FIGS. 4-6, generally, but the operation thereof will best be understood in connection with FIGS. 7 and 9-15.

Figure 10:
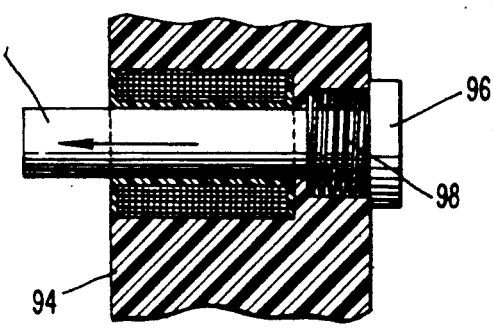
FIG. 10 is a sectional view showing a trigger pin in its extended configuration.
Figure 11:
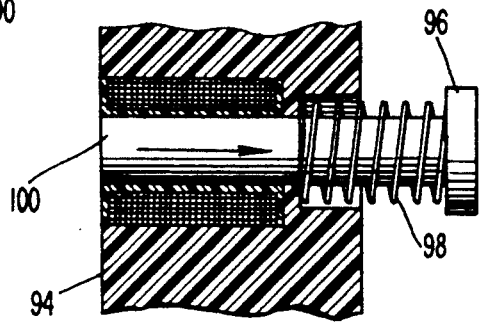
FIG. 11 is a sectional view of a trigger pin in its retracted configuration.

In FIG. 7, trigger wheel 94 is shown rotatably mounted to shaft 68. Transversely extending bores are formed in wheel 94 in equidistantly and circumferentially spaced relation to one another. Each bore slideably receives a shaft 100 of a trigger pin 95 having head 96. A spring 98 is sandwiched between a flat surface of wheel 94 and each head 96, as shown, but not all embodiments of the invention require the use of such springs. As best shown in FIGS. 10 and 11, each trigger pin has two positions, i.e., extending (FIG. 10) and retracted (FIG. 11). When a pin 95 is extended, the distal free end of its shaft 100 extends into the path of a retracted deflector 84; when a pin is retracted, the distal end of its shaft 100 is fully received within its associated bore, out of the path of travel of the deflector plates 84. The means for selectively extending and retracting each pin 95 is not specifically shown in the drawings, but any high speed means is satisfactory. Spring 98 could be used to bias each trigger pin into its retracted position as shown in FIG. 11, but numerous means exist that could accomplish the needed axial displacement of the trigger pins in the absence of springs.

An inspection of FIG. 7 will reveal that some of the trigger pins in that FIG. are retracted and some are extended; this is to indicate that any pattern of extended and retracted pins can be established at any moment in time.

Since each deflector 84 is pivotally mounted on its pivot shaft 86, and since each shaft 86 is carried by chain 80 as earlier mentioned, each deflector 84 is very closely spaced to chain 80 as shown in FIG. 7 but said chain does not interfere with the pivoting of each deflector about its pivot shaft when an extended shaft 100 of a trigger pin 95 is encountered.

Transversely extending lugs 90 which slideably engage reset plate 88 as mentioned above, play no part in the deployment process, i.e., they are never engaged by the trigger pins.

Sprocket wheel 80 and trigger wheel 94 rotate in a common direction. However, the angular velocity of sprocket wheel 80 that carries chain 74 is different than the angular velocity of trigger wheel 94. If sprocket wheel 80 rotates at a greater angular velocity than trigger wheel 94, deflectors 84 will travel faster than trigger pins 95, i.e., the deflectors will slideably engage an extended trigger pin shaft 100 as it overtakes said shaft, and said engagement effects the gradual deployment of the deflector as it pivots about its pivot shaft 86.

The gradual overtaking of an extended shaft 100 by pivot shaft 86 is shown in FIG. 9 and other FIGS. In FIG. 9, pin 95 having shaft 100 at the eleven o'clock position is leading pivot shaft 86 at the same general position and deflector 84 at that position has not yet been engaged by extended shaft 100. Shaft 100 at the twelve o'clock position is disposed slightly behind pivot shaft 86 and the deployment of deflector 84 has begun. As trigger wheel 94 rotates in the direction of directional arrow 95, the advancement of pivot shaft 86 in relation to trigger pin shaft 100 increases, as best understood by comparing the eleven o'clock position with the twelve o'clock position and the twelve o'clock position with the one o'clock position and so on as the chain 74 and wheel 94 rotate at their different speeds.

Conversely, if trigger wheel 94 is rotated at a faster rate of angular velocity than sprocket wheel 80, there still will be relative movement between trigger pin shafts 100 and the deflectors 84, but the deflectors 84 will rotate about their respective pivot shafts 86 in a direction opposite to that depicted in FIG. 9.

It should also be noted in FIG. 9 that there are ten trigger pins carried by trigger wheel 94; thus, the pins 95 having shafts 100 are spaced at thirty-six degree intervals about the periphery of wheel 94.

A different number of trigger pins is shown in FIG. 12. In that FIG., there are nine trigger pins 95 shafts 100; accordingly, the trigger pins are spaced at forty degree intervals about the periphery of wheel 94.

The deflectors 84 in FIG. 12 are also larger than the deflectors shown earlier, i.e., they have a greater radial extent when deployed as shown. Thus, to avoid mutual interference, they are spaced further apart relative to one another, along the extent of chain 74 as shown. These larger deflectors are reset or retracted in the same manner as the smaller deflectors, as indicated in FIG. 13.

FIG. 14 shows still another form of deflectors 84 and FIG. 15 shows how they are retracted in the same manner as the smaller deflectors. These deflectors have extensions 83 having utility in connection with certain types of containers. Each extension 83 is laterally offset a small amount as at 85 from the main body of deflector 84 so that contiguous deflectors do not interfere with one another when rotating about shaft 86 as shown in FIG. 15.

Deflectors 84 travel at about the same rate of speed as belt 14 in the embodiments that have been described. However, the deflectors of the third embodiment are stationary with respect to containers 50. Still, the third embodiment of the novel apparatus can achieve container deflection into multiple lanes as suggested by FIG. 16.

Significantly, no sprocket chains are employed in this third embodiment. Thus, the deflector plates 84 are not pivotally mounted to any chain. Instead, they are moveably mounted to side frame member 46 (which embodiment is not shown) or to a parallel frame member 47 intermediate side frames 46 and 48 as shown in FIG. 16. As shown in FIG. 17, these deflectors may be deployed in any predetermined pattern to deflect transported articles 50 of differing sizes as shown in FIG. 17.

When all deflectors 84 are deployed, as shown in FIGS. 18 and 19, a transported article 50 can be shunted completely off the belt 14. However, as shown in FIG. 20, if no deflection of travel is desired for transported articles traveling in a predetermined path of travel, deflectors 1-4 would be retracted. Obviously, the number of deflectors retracted will vary depending upon the profile of the containers as detected by a suitable means such as an electric eye.

If only a small deflection in the path of travel is desired, a single leading deflector could be lowered to cause the minor deflection as depicted in FIG. 21, and in that case deflectors 2-5 would be retracted to allow the package to continue its travel after the small deflection had been accomplished.

A slightly greater deflection is achieved in the configuration depicted in FIG. 22. Deflectors 1 and 2 are lowered and deflectors 3-6 are raised in this particular configuration. The same pattern is followed in FIGS. 23 and 24 to illustrate the versatility of this embodiment.

A fourth embodiment is shown in FIGS. 25-36. There it will be discerned that a wave-like motion may be created by lowering a leading group of deflectors to begin a deflection, followed by successively lowering new leading deflectors contiguous to the deployed deflectors and raising the trailing deflectors as the package travels along belt 14. Thus, each package sees an apparent stationary deflector rail as it is deflected.

In this fourth embodiment, all of the deflectors (denoted 1-24) are normally retracted, as shown in FIG. 25. Accordingly, all transported articles 50 may travel along belt 14 undeflected from their initial path of travel, as shown in FIG. 26.

If it is desired to deflect a plurality of articles 50 from a first edge of belt 14 to a second edge thereof, as shown in FIG. 28, the deflector deployment of FIG. 27 is employed.

Figure 37:
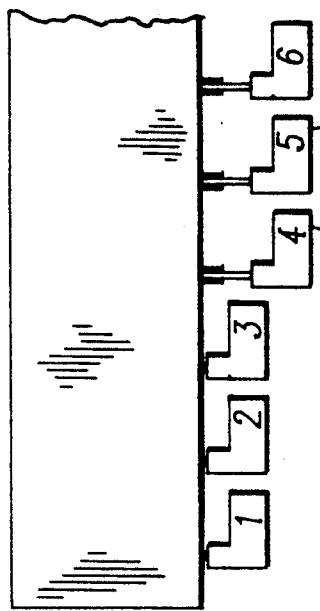
FIG. 37 is a diagramatic view depicting a typical deployment of the deflectors when the apparatus is in its wave-producing mode.
Figure 38:
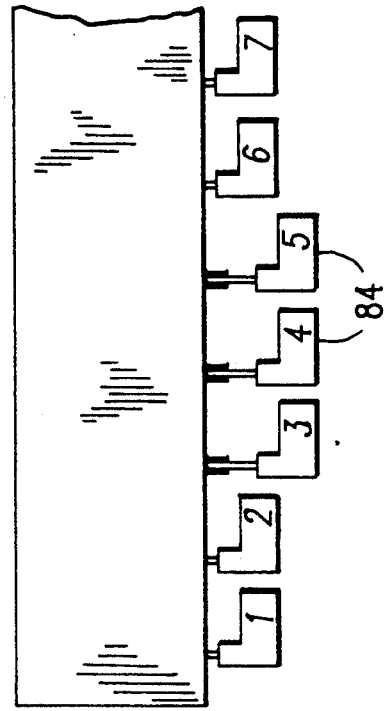
FIG. 38 is a diagramatic depiction to be construed in connection with FIG. 37.
Figure 39:
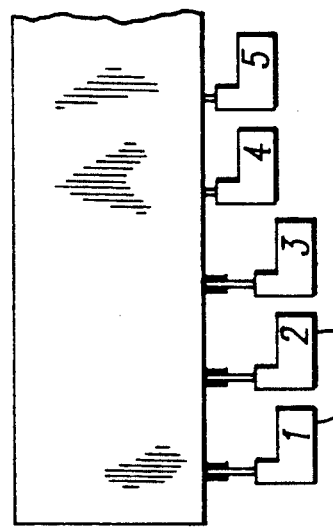
FIG. 39 is a diagramatic view of the same configuration shown in FIG. 37, which configuration is repeated so that it can be compared with the configuration of FIG. 40.
Figure 40:
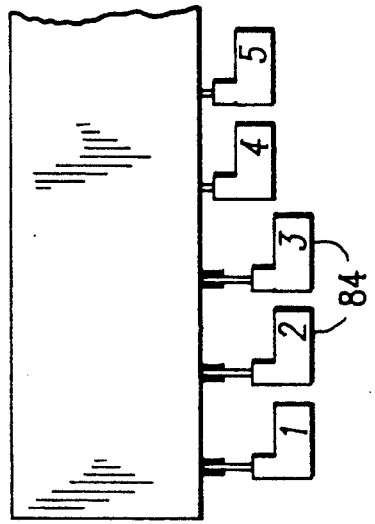
FIG. 40, when construed in configuration with FIG. 39, depicts what is meant by an overlapping wave-like motion of deflectors.

However, if it were desired to deflect only article 50D in FIG. 27, and to allow articles 50A, 50B and 50C to continue along an undeflected, initial path of travel, then at any one moment in time, only those deflectors actually in contact with the article being deflected would be deployed. Thus, only deflectors 1-4 would initially deploy; a smaller number of deflectors would deploy for a shorter article and a larger number would deploy for a longer article. For an article having the length depicted in FIG. 27, deflectors 5-8 would deploy when the article had attained the position of article 50B. Once the article was being deflected by deflectors 5-8, deflectors 1-4 would retract so that trailing packages would be undeflected. Thereafter, deflectors 6-9 would deploy and 5-8 would retract, and so on, creating the aforesaid wave-like motion. Alternately, there could be overlapping of the deployments and retractions, i.e., after 1-4 were deployed, only 1-3 could retract and 4 could stay deployed while 5-7 were deployed, etc. An example of the first type of non-overlapping wave-like motion is provided in FIGS. 37 and 38. FIGS. 39 and 40 depict what is meant by an overlapping wave-like motion.

FIGS. 29 and 30 show how a selective deployment of deflectors can shift an article by a lesser amount than depicted in FIGS. 27 and 28.

FIGS. 31 and 32 show a selective deployment that channels articles 50 to a different lane of belt 14 than the respective deployments of FIGS. 25-30.

An electric eye denoted 102 as a whole in FIGS. 33 and 34 is used in all embodiments to control the retraction and deploying of deflectors 84. It detects the leading edge of each transported article 50 and detects the trailing edge of each article as well. Computer means, not shown, then determines the length of each article so that the proper number of deflectors can be lowered or retracted to match the profile of that article, depending upon the application. Numerous other sensing means are used as required to determine the weight of the articles if that criteria is important, the color thereof, etc. and if an article is to be deflected off the conveyor because of a certain detected characteristic, or deflected to a different lane, the computer activates the appropriate trigger pins in the first and second embodiments or the appropriate deflectors in the third and fourth embodiments to achieve the desired results.

Three different article lengths are depicted in FIGS. 33-35, but it should be understood that any plurality of article lengths can be distinguished by the electric eye 102 at virtually any speed of belt 14.

Articles of differing lengths (or weight, color or other preselected parameter) have been deflected into five different lanes of belt 14 in FIG. 34. Each article "sees" only the particular deflectors that are momentarily deployed to deflect it. As soon as those deflectors have been passed by the article, they retract immediately so as not to cause the deflection of a trailing article, unless the computer calls for continued deployment. Thus, in addition to a wave-like motion that accompanies a single article through its deflection, a much more complex pattern of independent waves may appear in certain applications such as depicted in FIG. 34.

Thus, each individual wave may deploy any number of deflectors, depending upon the length of the associated article, and each deployment may last for differing periods of time, depending upon the amount of deflection desired, as should be understood from FIG. 34 and other FIGS.

FIG. 36 shows how an article 50 is straightened out after completing its deflection. The speed of the belt serves to rotate each article in the direction indicated by the directional arrows in that FIG. until it has regained its initial alignment. This "automatic" re-straightening is made possible because the deflectors are stationary with respect to each article 50.

This invention pioneers the art of conveyor deflectors that move at substantially the same rate of speed as the conveyor belt. It also pioneers the art of deflectors that are deployed and retracted in a wave-like motion and in a multiplicity of independent wave-like motions. Therefore, the claims that follow are to be broadly interpreted, so as to protect the heart or essence of this technological breakthrough. For example, many articles may be transported by flotation, i.e., the conveyor belt shown herein could just as easily be a flowing stream of liquid and articles 50 could float down said stream. In such an application, the deflecting members would operate most advantageously if positioned in a retracted position below the surface of the water. Thus, said deflectors would act from below, i.e., the extended positions thereof would deploy such deflectors either above the surface of the water or at least near said surface so as to contact and deflect the submerged part of the articles selected for deflection. Thus, claim language referring to a frame structure disposed in vertically spaced, bridging relation to a conveyor belt should be understood as also covering the just-mentioned liquid conveyor belt. Many other examples as to what is meant by broad interpretation of the claims would be given but are omitted in the interest of brevity and because all of such broad interpretations are to be applied, as a matter of law as aforesaid.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,

What is claimed is:

1. An apparatus for diverting articles carried by a conveyor means from a predetermined path of travel, comprising:

an elongate frame structure disposed in bridging relation to a conveyor means, in predetermined vertically spaced relation thereabove and at a predetermined angle relative thereto;

said frame structure including a pair of elongate, transversely spaced apart frame members disposed in parallel relation to one another;

a first, transversely disposed, rotatably mounted shaft member disposed in interconnecting relation to said frame members at a common first end thereof;

a second, transversely disposed, rotatably mounted shaft member disposed in interconnecting relation to said frame members at a common second end thereof;

said first shaft member carrying first and second sprocket wheels thereon;

said second shaft member carrying first and second sprocket wheels thereon;

a first longitudinally extending sprocket chain disposed in interconnecting relation between said first sprocket wheels of said first and second shaft members;

a second, longitudinally extending sprocket chain disposed in interconnecting relation between said second sprocket wheels of said first and second shaft members;

variable speed motor means disposed in driving relation to a preselected shaft of said first and second shaft members to rotate said first and second chains at a preselected rate;

a plurality of deflectors being pivotally connected to said first chain in longitudinally spaced relation to one another along a predetermined extent of said first chain;

each of said deflectors having a pivoted, deployed position where it depends from said first chain and is disposed in obstructing relation to articles carried by said conveyor means and an unpivoted, retracted position where it is disposed in non-obstructing relation to said articles; and means for selectively pivoting each of said plurality of deflectors;

whereby preselected articles carried by said conveyor means are displaced relative to said conveyor means, when obstructed by a deployed deflector.

2. The apparatus of claim 1, wherein said means for deploying and retracting said deflectors includes a sensor means for sensing predetermined parameters of articles carried by said conveyor means, said sensor means being disposed adjacent said conveyor means upstream of said frame structure.

3. The apparatus of claim 2, wherein said means for selectively pivoting said deflectors includes a reciprocable trigger pin member mounted on said frame structure, said trigger pin member being preselectively extendable into obstructing relation relative to a path of travel of said deflectors and retractable into non-obstructing relation thereto, said extension and retraction being controlled by said sensor means.

4. The apparatus of claim 2, wherein said means for selectively pivoting said deflectors includes said first and second sprocket wheels carried on said second shaft member, wherein said deflectors are pivotally mounted to said first sprocket chain at predetermined longitudinal intervals along the extent thereof, wherein a plurality of equidistantly and circumferentially spaced, laterally extending trigger pin members are mounted about the periphery of said second sprocket wheel, and wherein said second sprocket wheel rotates at an angular velocity different from an angular velocity of said first sprocket wheel so that the trigger pin members carried by said second sprocket wheel obstruct the path of travel of said deflectors at a gradual rate.

5. The apparatus of claim 4, further comprising means for extending and retracting said trigger pin members into obstructing and non-obstructing relation, respectively, to said deflectors.

* * * * *